United States Patent [19]

Sigal et al.

[11] 3,782,302

[45] Jan. 1, 1974

[54] METHOD OF THERMAL PURIFICATION OF WASTE NOT FORMING A BURNING MIXTURE WITH FUEL OR AIR SEPARATELY

[76] Inventors: Isaak Yakovlevich Sigal, ulitsa Ezhena Petie, II, kv. 107; Georgy Fedorovich Naidenov, ulitsa Saratovskaya, 39, kv. 21; Nikolai Alexandrovich Gurevich, ulitsa Frunze, 118/2 kv. 13; July Iosifovich Danilevich, ulitsa Saksagankago, 112, kv. 10, all of Kiev; Andrei Matveevich Shiman, ulitsa Sadovaya, 2, kv. 2, Shebekino; Viktor Fedorovich Shishkin, Ulitsa B. Khmelnitskogo 8, kv. 7, Shebekino; Nikolai Ivanovich Goncharenko, ulitsa Sadovaya 16, kv. I, Shebekino, all of U.S.S.R.

[22] Filed: Oct. 12, 1972

[21] Appl. No.: 297,065

Related U.S. Application Data

[63] Continuation of Ser. No. 42,864, June 2, 1970.

[52] U.S. Cl. .............................. 110/8 R, 23/277 C

[51] Int. Cl. ............................................ F23g 7/00
[58] Field of Search .................. 110/7 R, 8 R, 8 A; 23/277 C; 122/7 R

[56] References Cited

UNITED STATES PATENTS

| | | | |
|---|---|---|---|
| 3,215,501 | 11/1965 | Phillips | 23/277 |
| 3,251,656 | 5/1966 | Edwards | 23/277 |
| 3,311,456 | 3/1967 | Denny et al. | 23/277 |
| 3,433,218 | 3/1969 | Wiesenthal | 122/7 |
| 3,484,189 | 12/1969 | Hardison et al. | 23/277 X |

*Primary Examiner*—Kenneth W. Sprague
*Attorney*—John C. Holman et al.

[57] ABSTRACT

A method of thermal purification of waste gases from impurities, mainly organic ones, consisting in burning them directly in the furnaces of boiler units including those whose main function is generation of thermal and electrical energy. The waste gases to be purified are delivered under, or into the beginning of, the fuel burning zone instead of part or all of the air required for the combustion of the fuel.

5 Claims, No Drawings

METHOD OF THERMAL PURIFICATION OF WASTE NOT FORMING A BURNING MIXTURE WITH FUEL OR AIR SEPARATELY

This is a continuation of U.S. Pat. application Ser. No. 42,864, filed June 2, 1970.

The present invention relates to the field of waste gases purification and more particularly it refers to the methods of thermal purification of waste gases. The inventive method is intended for the purification of waste gases in various industrial enterprises from impurities, mainly organic ones. For instance, the method can find particular utility for purifying the waste gases generated in the production of synthetic fat substitutes, dyestuffs, antibiotics, synthetic fibres and other products, of organic synthesis and for purifying the waste gases liberated in the process of oil refining, drying of coatings, smoking, etc.

Widely known and used is the method of thermal purification of waste gases from organic impurities by their catalytic burning. This method consists in low-temperature oxidation of organic impurities in waste gases on a catalyst, e.g. palladium, platinum, at 200°–350° C. The degree of purification of waste gases by catalytic burning depends on the efficiency of the catalyst and reaches 95–98 percent. The disadvantages of the method of catalytic burning are a high cost of the catalyst, a necessity for its periodical regeneration, a reduced efficiency of the catalyst if the waste gases contain dust, moisture or substances capable of contaminating the catalyst, e.g. sulphur, phosphorous, etc.

Also known, but less frequently used is a method of thermal purification of waste gases from organic impurities by their direct burning in specially designed furnaces or in the furnaces of boiler units. This method consists in high-temperature oxidation of organic impurities in waste gases at 800° C and higher, the waste gases being delivered above, or directly into, the burning zone of the fuel, independently of the combustion air delivered for burning the fuel. The degree of purification of waste gases obtained in this method depends on the temperature in the furnace and the time the organic impurities stay in the burning zone. The main disadvantages of the method are a considerable consumption of heat energy for heating the waste gases to 800° C and above, and a lower degree of purification of waste gases compared to the method of catalytic burning.

An object of the present invention resides in working out a method of thermal purification of waste gases by their direct burning which improves the degree of purification and reduces the amount of heat energy required.

This object has been achieved by providing a method which, according to the invention, consists in delivering the waste gases for purification under, or into the beginning of, the fuel burning zone so that the quantity of oxygen introduced into said zone by the air delivered for the burning of fuel and by the waste gases or by the waste gases along is be not smaller than that required for complete combustion of the fuel and impurites in the waste gases and not larger than that introduced both by said air and waste gases taken together. In this case the quantity of waste gases is selected so as to create such a concentration of oxygen in the fuel burning zone which ensures stable combustion of the fuel. It is also recommended to divide the waste gases before their delivery for purification into small jets and distribute them uniformly over the stream of air delivered for fuel combustion. This ensures rapid mixing and heating of the gases. The above-described method is efficient in the furnaces of boiler units. If several types of fuel are available, preference should be given to natural gas since the process of its combustion is accompanied by a minimum liberation of poisonous products of combustion.

Owing to the delivery of waste gases under, or into the beginning of, the fuel burning zone, the impurities stay longer in the zone of high temperatures and are therefore burnt up more completely. When waste gases are delivered so that the amount of oxygen in the burning zone remains within the mentioned limits, this corresponds to the minimum losses of the heat energy for heating the gases taking no part in fuel combustion and, consequently, results in a maximum possible temperature level in the burning zone. As a result, the impurities in the waste gases burn up more completely and the process of purification requires a minimum quantity of heat energy. The highest effect is obtained if the quantity of oxygen in the fuel burning zone is maintained at the lower boundary of the abovementioned limit.

The inventive method of purification allows the basic parameters of the boiler unit (steam temperatures, efficiency, etc.) to be retained within allowable limits. This becomes most important when the basic function of the boiler unit is not purification of waste gases but generation of heat and electric energy.

EXAMPLE

The waste gases generated by the oxidation towers in the process of paraffin oxidation which accompanies the production of synthetic fatty acids have the following composition in vol. -percent:

| | |
|---|---|
| Nitrogen | 89.0 |
| Oxygen | 7.0 |
| Carbon dioxide | 3.7 |
| Vapours of organic substances, hydrocarbons, low-molecular fatty acids, aldehydes, ketones, etc. | 0.3 |

The waste gases in a quantity of 30,000 m³/hr (here and hereafter the cubic metres are taken for standard conditions) are fed through a carefully pressurized system of pipes to four boiler units of 35 t/hr steam capacity each, which supply the given enterprise with thermal and electrical energy. Before the delivery of the waste gases, the furnaces of each boiler unit was supplied with 3,000 m³/hr of natural gas and 32,000 m³/hr of air required for combustion. The amount of oxygen carried with the supplied air into the fuel burning zone was equal to 0.21 × 32,000 = 6,720 m³/hr. The waste gases to be purified are fed into the furnace of each boiler under the fuel burning zone in a quantity of 7,500 m³/hr. This quantity carries 0.07 × 7,500 = 525 m³/hr of oxygen. Subtract this quantity from the amount of oxygen introduced into the burning zone by the combustion air: 6,720 − 525 = 6,195 m³/hr which corresponds to a reduction of air supply up to 6,195/0.21 = 29,500 m³/hr. Thus, the furnace of each individual boiler unit is supplied with 3,000 m³/hr of fuel (natural gas), 29,500 m³/hr of air and 7,500 m³/hr of waste gases of the above stated composition, all these substances introducing 6,720 m³/hr of oxygen into the fuel burning zone. The concentration of oxygen in the fuel burning zone is 6,720/3,000 + 29,500 + 75,000 · 100 = 16.8 percent which is sufficient for steady combustion of natural gas. If 7,500 m³/hr of waste gases and 32,000 m³/hr of air initially fed into the boiler furnace were added, the amount of oxygen introduced into the fuel burning zone would be 6,720 + 525 = 7,245 m³/hr. The amount of oxygen required for complete combustion of 3,000 m³/hr of natural gas and of impurities in the waste gases is equal to 6,300 m³/hr. Given below are the factors characterizing the degree of purification of said waste gases in accordance with the method described above:

| Name of impurities in waste gases | Content of impurities in waste gases before purification, mg/m³ | Content of impurities in waste gases after purification mg/m³ |
|---|---|---|
| Low-molecular fatty acids in terms of acetic acid | 1870 | 0.5 |
| Aldehydes in terms of formaldehyde | 70 | traces |
| Ketones in terms of acetone | 125 | 1.5 |

Thus, the degree of purification of the waste gases in accordance with the present method is not under 99 percent and the basic functions of the boiler unit concerning generation of thermal and electrical energy are not interfered with. The reliability of the method is confirmed by its prolonged use in industrial conditions.

What we claim is:

1. A method of thermal purification of waste gases which consists of oxidizable impurities, inert ingredients, and a small proportion of oxygen, such that said gases cannot create a burning mixture with a fuel only or with air only, said method comprising introducing said waste gases into the fuel burning zone of a furnace while introducing fuel and air for the combustion of said fuel, so that the amount of oxygen supplied to the burning zone both by said air delivered for combustion of fuel and by said waste gases is not less than an amount required for the complete combustion of said fuel and said oxidizable impurities in said waste gases and less than said combustion air required for the complete combustion of said fuel.

2. A method of thermal purification of waste gases in accordance with claim 1 wherein the amount of waste gases is selected so as to build up such a concentration of oxygen in the fuel burning zone which would ensure steady combustion of the fuel.

3. A method of thermal purification of waste gases according to claim 1 wherein before feeding the waste gases into the furnace they are broken down into small jets and distributed uniformly over the stream of air delivered for the combustion of fuel.

4. A method of thermal purification of waste gases in accordance with claim 1 wherein the waste gases are purified in the furnace of a boiler unit.

5. A method of thermal purification of waste gases which consists of oxidizable impurities, inert ingredients, and a small proportion of oxygen, such that said gases cannot create a burning mixture with a fuel only or with air only, said method comprising introducing said waste gases into the fuel burning zone of a furnace while introducing fuel and air for the combustion of said fuel, so that the amount of oxygen supplied to the burning zone both by said air delivered for combustion of fuel and by said waste gases is not less than an amount required for the complete combustion of said fuel and said oxidizable impurities in said waste gases.

* * * * *